(12) United States Patent
Hiddink et al.

(10) Patent No.: US 7,586,948 B2
(45) Date of Patent: Sep. 8, 2009

(54) PACKET SUB-FRAME STRUCTURE FOR SELECTIVE ACKNOWLEDGMENT

(75) Inventors: Gerritt W. Hiddink, Utrecht (NL); Richard M. van Leeuwen, Zoetermeer (NL); Mark Wezelenburg, Tiel (NL)

(73) Assignee: Agere Systems Inc., Allentown, PA (US)

( * ) Notice: Subject to any disclaimer, the term of this patent is extended or adjusted under 35 U.S.C. 154(b) by 820 days.

(21) Appl. No.: 10/746,153

(22) Filed: Dec. 24, 2003

(65) Prior Publication Data

US 2005/0157715 A1 Jul. 21, 2005

(51) Int. Cl.
*H04J 3/24* (2006.01)
(52) U.S. Cl. .................. 370/473; 370/338; 370/389; 370/394; 370/465; 370/474; 709/236
(58) Field of Classification Search .......... 370/474, 370/465, 338, 389, 394, 473; 709/236
See application file for complete search history.

(56) References Cited

U.S. PATENT DOCUMENTS

| | | | | |
|---|---|---|---|---|
| 4,727,536 A * | 2/1988 | Reeves et al. | ............... | 370/468 |
| 5,467,342 A | 11/1995 | Logston et al. | ............... | 370/17 |
| 5,583,859 A | 12/1996 | Feldmeier | ............... | 370/471 |
| 6,041,051 A | 3/2000 | Doshi et al. | | |
| 6,236,647 B1 * | 5/2001 | Amalfitano | ............... | 370/335 |
| 6,317,430 B1 | 11/2001 | Knisley et al. | | |
| 6,452,946 B1 | 9/2002 | Manzardo | ............... | 370/487 |
| 6,594,278 B1 | 7/2003 | Baroudi | ............... | 370/466 |
| 6,614,808 B1 | 9/2003 | Gopalakrishna | ............ | 370/469 |
| 6,640,248 B1 | 10/2003 | Jorgensen | | |
| 6,775,804 B1 * | 8/2004 | Dawson | ............... | 714/776 |
| 6,859,501 B1 * | 2/2005 | Zimmermann et al. | ...... | 375/260 |
| 6,865,163 B1 * | 3/2005 | Bergenwall et al. | ......... | 370/288 |
| 6,877,043 B2 * | 4/2005 | Mallory et al. | ............... | 709/251 |
| 6,928,289 B1 * | 8/2005 | Cho et al. | ............... | 455/452.2 |
| 6,987,770 B1 | 1/2006 | Yonge, III | ................ | 370/401 |
| 7,139,283 B2 | 11/2006 | Quigley et al. | ............ | 370/432 |
| 7,231,530 B1 * | 6/2007 | Miller et al. | ................ | 713/320 |

(Continued)

FOREIGN PATENT DOCUMENTS

EP 0 912 016 A2 4/1999

(Continued)

OTHER PUBLICATIONS

Yeung, Ka; 802.11a Modeling and MAC Enhancements for High Speed Rate Adaptive Networks, Dec. 12, 2002, UCLA.*

(Continued)

*Primary Examiner*—Ricky Ngo
*Assistant Examiner*—Luat Phung
(74) *Attorney, Agent, or Firm*—Mendelsohn, Drucker & Associates, P.C.; Kevin M. Drucker; Steve Mendelsohn

(57) ABSTRACT

A wireless local area network includes transmission of data packets between endpoints in which packet frames are divided into sub-frames. On reception of a frame, the integrity of each individual sub-frame is checked. Sub-frames that pass the integrity check are acknowledged and retransmission is requested only for sub-frames that failed the integrity check. Consequently, only the affected sub-frames require retransmission instead of the whole frame.

22 Claims, 5 Drawing Sheets

U.S. PATENT DOCUMENTS

| | | | |
|---|---|---|---|
| 7,298,691 B1 | 11/2007 | Yonge, III et al. | 370/203 |
| 7,492,789 B2 | 2/2009 | Shvodian | 370/469 |
| 2001/0024435 A1 | 9/2001 | Birdwell et al. | 370/349 |
| 2002/0093928 A1 | 7/2002 | LoGalbo et al. | 370/336 |
| 2002/0110148 A1 | 8/2002 | Hickman et al. | 370/475 |
| 2002/0147025 A1* | 10/2002 | Savas | 455/522 |
| 2002/0167962 A1 | 11/2002 | Kowalski | 370/445 |
| 2003/0058862 A1 | 3/2003 | Lansing et al. | 370/392 |
| 2003/0086366 A1 | 5/2003 | Branlund et al. | 370/208 |
| 2003/0128706 A1 | 7/2003 | Mark et al. | 370/395.1 |
| 2003/0135640 A1 | 7/2003 | Ho et al. | 709/237 |
| 2003/0169769 A1 | 9/2003 | Ho et al. | |
| 2003/0171114 A1 | 9/2003 | Hastings | 455/426.2 |
| 2004/0052273 A1 | 3/2004 | Karaoguz et al. | 370/465 |
| 2004/0141460 A1* | 7/2004 | Holtzman et al. | 370/216 |
| 2004/0141525 A1* | 7/2004 | Bhushan et al. | 370/473 |
| 2004/0180696 A1* | 9/2004 | Foore et al. | 455/561 |
| 2004/0240424 A1* | 12/2004 | Fong et al. | 370/349 |
| 2005/0053037 A1* | 3/2005 | Ginzburg et al. | 370/333 |
| 2005/0114489 A1 | 5/2005 | Yonge et al. | 709/223 |
| 2005/0286523 A1* | 12/2005 | Liao et al. | 370/389 |
| 2007/0101020 A1* | 5/2007 | Lin et al. | 709/238 |

FOREIGN PATENT DOCUMENTS

| | | |
|---|---|---|
| EP | 0 987 842 A1 | 3/2000 |
| GB | 2 315 694 A | 2/1998 |
| GB | 2 315 964 A | 2/1998 |
| JP | 2000295313 A * | 10/2000 |
| WO | WO 99/63703 | 12/1999 |
| WO | WO 02/05453 A2 | 1/2002 |
| WO | WO 2004/039011 A2 | 5/2004 |

OTHER PUBLICATIONS

Zhou, Y.Q. and J. Wang, "Optimum Sub-packet Transmission for Turbo-coded Hybrid ARQ Systems", IEEE 2003, pp. 3080-3084.*

Guo, N., F. Khaleghi, A. Gutierrez, J. Li and M-H. Fong, "Transmission of High Speed Data in cdma 2000", IEEE 1999, pp. 1442-1445.*

"Energy Saving in IEEE 802.11 Communications Using Frame Aggregation," by Jean Lorchat et al., GLOBECOM 2003, IEEE Global Telecommunications Conference. Conference Proceedings, San Francisco, Dec. 1-5, 2003, IEEE Global Telecommunications Conference, New York, NY, IEEE, US, vol. 7 of 7, pp. 1296-1300, XP010677504.

"Data Link Frame Aggregation Protocol," by J. Michael Meehan et al., International Conference O-N Computers and Their Applications, Proceedings of ISCA Cata, Apr. 4, 2006, San Francisco, CA, pp. 1-4, XP009044947.

* cited by examiner

PACKET SUB-FRAME STRUCTURE FOR SELECTIVE ACKNOWLEDGMENT

BACKGROUND OF THE INVENTION

1. Field of the Invention

The present invention relates to communication networks, and, more particularly, to a frame format for selective acknowledgment in a wireless communication network.

2. Description of the Related Art

Wireless local area networks (WLANs) include one or more non-fixed stations (or mobile terminals) such as cell phones, notebook (laptop) computers, and hand-held computers, equipped with generally available, WLAN PC cards that enable them to communicate among themselves as well as through a network server. The network server provides support for communication between mobile terminals in different service sets (service areas) which are associated with different access points (APs). An AP is a terminal or other device that provides connectivity to other networks or service areas, and may be either fixed or mobile. Such WLAN networks allow mobile terminals to be moved within a particular service area without regard to physical connections among the mobile terminals within that service area. An example of a WLAN network is a network that conforms to standards developed and proposed by the Institute of Electrical and Electronic Engineers (IEEE) 802.11 Committee (termed herein as a network operating in accordance with one or more editions of the IEEE 802.11 standard). Typically, all messages transmitted among the mobile terminals of the same cell (i.e., those terminals associated with the same AP) in such WLAN networks are transmitted to the access point (AP) rather than being directly transmitted between the mobile terminals. Such centralized wireless communication provides significant advantages in terms of simplicity of the communication link as well as in power savings.

Most networks are organized as a series of layers, each one built upon its predecessor. The purpose of each layer is to offer services to the higher layers, shielding those layers from implementation details of lower layers. Between each pair of adjacent layers is an interface that defines those services. The International Standards Organization has developed a layered network architecture called the Open Systems Interconnection (OSI) Reference model that has seven protocol layers: application, presentation, session, transport, network, data link, and physical. The function of the lowest level, the physical layer, is to transfer bits over a communication medium. The function of the data link layer is to partition input data into data frames and transmit the frames over the physical layer sequentially. Each data frame includes a header that contains control and sequence information for the frames.

The interface between the data link layer and the physical layer includes a medium access control (MAC) device and a physical layer signaling control device, called a PHY device. The purpose of the MAC device and the PHY device is to ensure two network stations are communicating with the correct frame format and protocol. Not all communication networks require all layers of the OSI model. For example, in a wireless communication networks, physical, network, and application layers are typically sufficient to enable operation.

In WLANs, the physical device is a radio and the physical communication medium is free space. The IEEE 802.11 standard for WLANs defines the communication protocol between a MAC device and a PHY device. According to the WLAN data communication protocol, each data frame transferred between the MAC device and the PHY device has a PHY header, a MAC header, MAC data, and error checking fields. The PHY header includes a preamble that is used to indicate the presence of a signal, unique words, frame length, etc. The MAC header includes frame control, duration, source (i.e., MAC) and destination address, and data sequence number. FIG. 1 shows a typical frame format 100 for 802.11 wireless LAN systems. Frame format 100 comprises packet header 101, payload data 102 and frame check sequence (FCS) 103.

The maximum achievable throughput of 802.11 wireless LAN systems largely depends on the length of the frames that carry the data information (payload). With relatively good channel quality, the throughput efficiency increases when a larger frame size is used. This increase in throughput efficiency is mainly due to the large, fixed-size of the MAC overhead, such as: Inter Frame Space (IFS), preamble and Physical Layer Convergence Protocol (PLCP) header, MAC header, and FCS.

Section 7.6 of the 802.11 version "e" draft D3.0 specifies MAC-Level Forward Error Correction (FEC) and FEC frame formats in which frames are also divided in blocks. The MAC header and each block have their own FEC fields enabling detection and correction of errors in the separate blocks. However, the frame is dropped if one or more of the blocks are corrupted.

SUMMARY OF THE INVENTION

The present invention relates to transmission of data packets between endpoints in which packet frames are divided into sub-frames. On reception of a frame, the integrity of each individual sub-frame is checked. Sub-frames that pass the integrity check are acknowledged and retransmission is requested only for sub-frames that failed the integrity check. Consequently, only the affected sub-frames require retransmission instead of the whole frame.

In accordance with a first exemplary embodiment of the present invention, a packet frame for a data payload is generated by (a) dividing the data payload into one or more sub-frame payloads; (b) appending, to each of the sub-frame payloads, a corresponding sub-frame sequence number and a corresponding sub-frame integrity check value to generate a sub-frame; (c) arranging the sub-frames into a sub-frame sequence; (d) generating a header integrity check value for a header; and (e) appending the header integrity check value to the sub-frame sequence to form a frame.

In accordance with a second exemplary embodiment of the present invention, a transmitter sends data by (a) forming a packet frame from payload data, the packet frame including one or more sub-frames and each sub-frame comprising sub-frame payload data and a sub-frame sequence number; (b) transmitting the packet frame to a receiver; (c) receiving an acknowledgment message from the receiver, the acknowledgment message identifying each sub-frame of the packet frame received by the receiver; (d) determining each sub-frame of the packet frame not received by the receiver; and (e) re-transmitting each sub-frame not received by the receiver to the receiver.

In accordance with a third exemplary embodiment of the present invention, a receiver processes a packet frame into payload data by (a) receiving the packet frame, wherein 1) the packet frame comprises a header, a header integrity check value, a packet frame integrity check value, and one or more sub-frames, and 2) each sub-frame comprises a sub-frame integrity check value and a sub-frame sequence number; (b) verifying the integrity of the received packet frame based on the packet frame integrity check value; (c) verifying, if the integrity of the received packet frame is not verified, the integrity of the header based on the header integrity check value; and (d) verifying, if the integrity of the header of the received packet frame is verified, the integrity of each sub-frame based on the corresponding sub-frame integrity check value.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
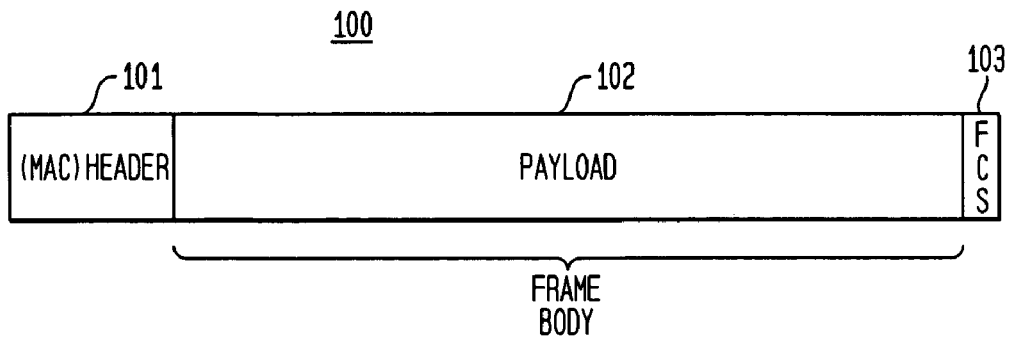
FIG. 1 shows a typical prior art frame format for 802.11 wireless LAN systems.
Figure 2:
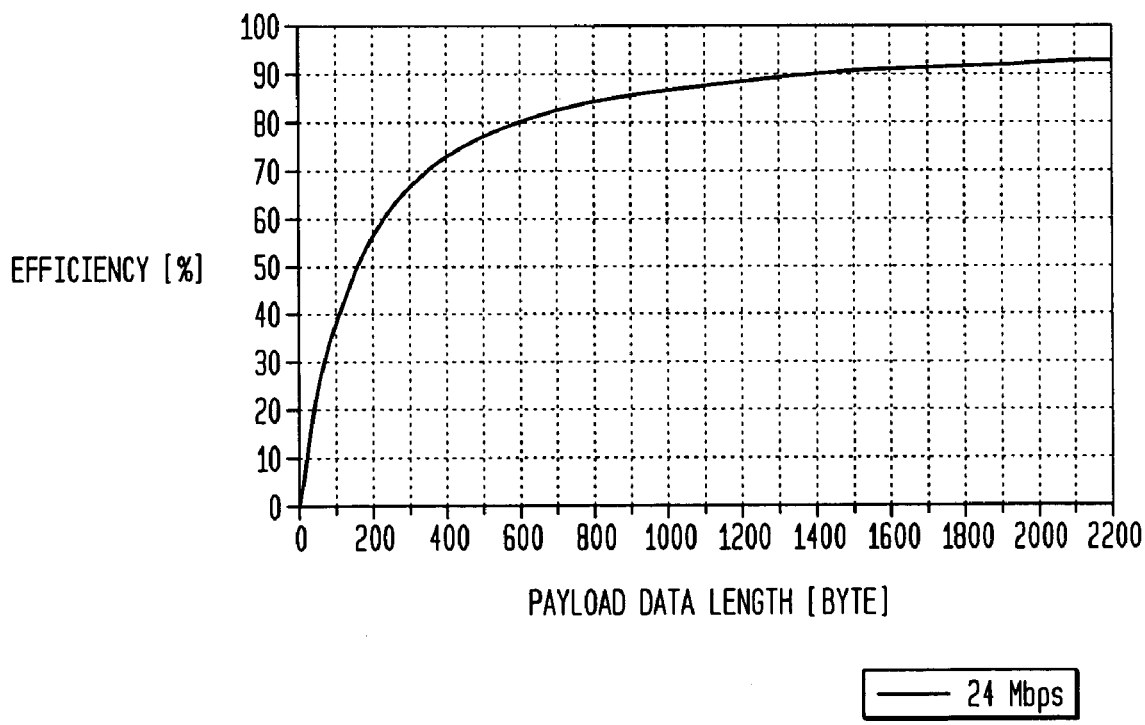
FIG. 2 is a graph of throughput efficiency versus payload data length for a system under ideal channel conditions.

As an aid to understanding the present invention, FIG. 2 is a graph of throughput efficiency versus payload data length, where the points of the graph are generated by simulation for an 802.11 wireless LAN system using orthogonal frequency division multiplex (OFDM) modulation and a transmit rate of 24 Mbps with ideal channel conditions. The efficiency indicates which percentage of the active medium time is actually used to transmit payload data. The simulation employed for generating the graph of FIG. 2 accounts for the fixed-size MAC overhead, but does not include contention, polling, and acknowledgment overhead.

Figure 3:
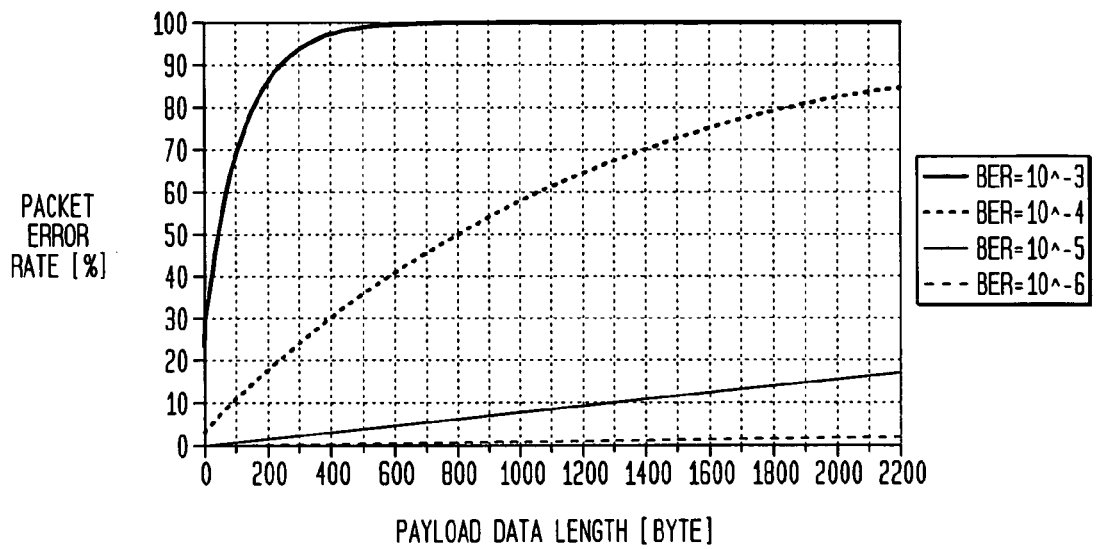
FIG. 3 is a graph of packet error rate versus payload data length with various bit error rate (BER) values.

In practice, the channel conditions are not ideal and channel errors occur. When a bit in a frame (packet) is corrupted, the FCS check at the receiver fails and the frame is discarded. The Packet Error Rate (PER) should be low to achieve a high net throughput, so, for a low PER at a given Bit Error Rate (BER), frames should include a relatively short payload data length. Assuming bit errors are randomly distributed, FIG. 3 is a graph of PER versus payload data length for various BER values.

Figure 4:
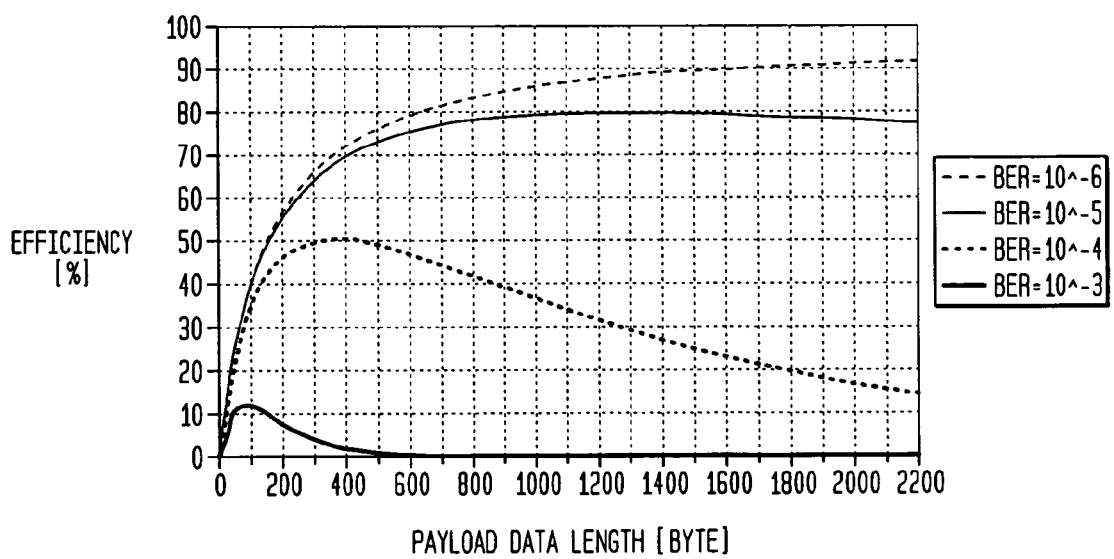
FIG. 4 shows a graph of efficiency versus payload data length where both MAC overhead and BER are taken into account.

To overcome inefficiency from the fixed-size MAC overhead, frame payload data length should be large, but to maintain a low PER at a given BER, frame payload data length should be small. FIG. 4 shows the resulting graph of efficiency versus payload data length where both MAC overhead and BER are taken into account. FIG. 4 shows that the efficiency for, for example, a BER of $10^{-4}$ increases as expected when the payload data length is increased up to about 300 bytes. Above this length, the PER dominates and the efficiency drops.

In accordance with embodiments of the present invention, a frame format allows for variation of frame payload data length, and allows for selective acknowledgment of portions of the data that are received. Such frame format allows for increased efficiency due to fixed size MAC overhead and maintains a low PER for a given set of channel conditions.

Figure 5:
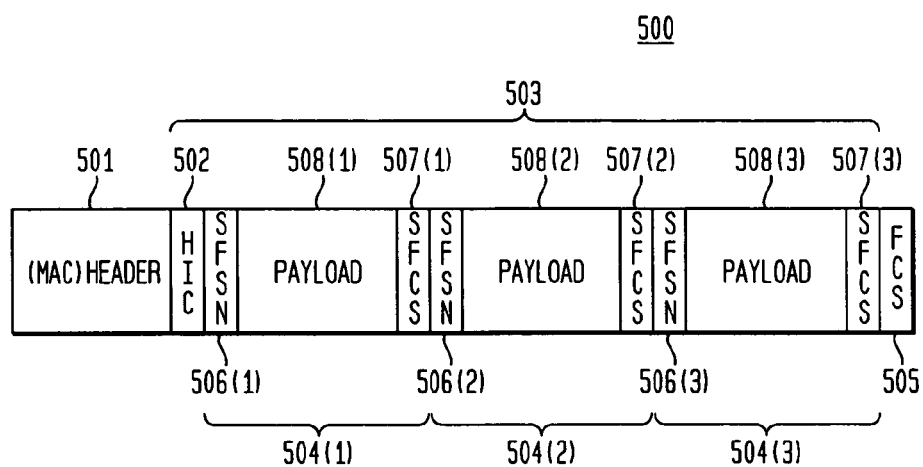
FIG. 5 shows a frame format in accordance with an exemplary embodiment of the present invention in which a frame is divided into sub-frames.

FIG. 5 shows a frame format 500 in accordance with an exemplary embodiment of the present invention comprising header 501, header integrity check (HIC) 502, frame body 503 having sub-frames 504(i) (i=1,2,3), and frame check sequence (FCS) 505. Header 501 is shown as a MAC layer header and might conform to a typical MAC layer protocol for an 802.11 standard. FCS 505 is a checksum value computed for the entire frame format 500, and HIC 502 is a checksum value computed for header 501.

In FIG. 5, frame body 503 is divided into sub-frames 504(1), 504(2), and 504(3), but the present invention is not so limited and the number of sub-frames may vary depending on specific design and channel conditions. To enable an acknowledgment and retransmission method in accordance with the present invention, each sub-frame 504(i) has its own sub-frame sequence number (SFSN) 506(i) and sub-frame check sequence (SFCS) 507(i). SFSN 506(i) is a sequence number pre-pended to and associated with corresponding sub-frame payload data block 508(i) (e.g., user data), while SFCS 507(i) is a checksum value computed for sub-frame payload 508(i). Sub-frames are preferably numbered independently of the sequence field in header 501, since frames might include some re-transmitted sub-frames as well as new sub-frames. SFCS 507(i) might be computed including SFSN 506(i).

When a receiver examines a packet having frame format 500, the checksum for the packet is computed and compared to FCS 505. If the computed packet checksum and FCS 505 match, the packet contains no errors and may be processed. If the computed packet checksum and FCS 505 do not match, the packet contains at least one error. To enable the verification of the integrity of (e.g., MAC) header 501 in case of a failed comparison, a checksum for header 501 is computed and compared to HIC 502. If the comparison of the checksum for header 501 and HIC 502 indicates that header 501 is corrupted, the receiver will drop the entire packet.

If the comparison of the checksum for header 501 and HC 502 indicates that header 501 is valid, at least one of the sub-frames has an error. In addition, the FCS may be corrupted, but in this case the header information and sub-frame information will be verified. For each sub-frame 504(i), a checksum is calculated and compared with corresponding SFCS 507(i). For those sub-frames in which the comparison passes, the sub-frame is valid and the corresponding payload data block is passed on for processing. For those sub-frames in which the comparison fails, the sub-frame is corrupted, the receiver will not acknowledge receipt of a correct sub-frame, and the receiver causes the sender to re-transmit each sub-frame having a failed comparison.

Figure 6:
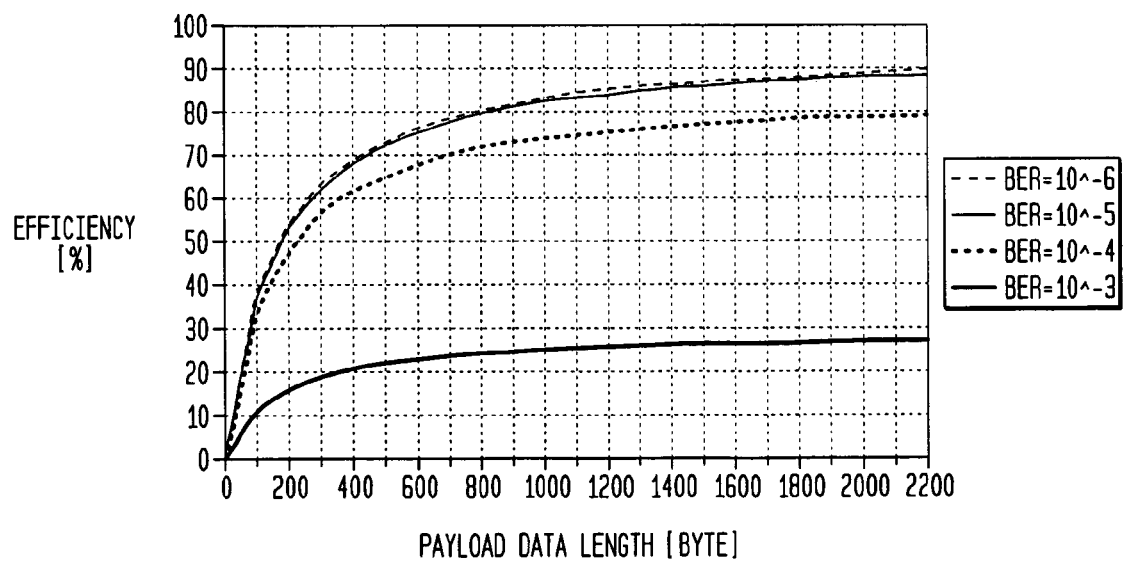
FIG. 6 shows a graph of efficiency versus payload data length where both MAC overhead and BER are taken into account and employing the frame format of FIG. 5.

Frame format 500 enables a receiver to selectively acknowledge reception of sub-frames, thus selectively informing the sender of correct sub-frames that have been received. Instead of re-transmitting the whole frame, the sender might then retransmit only the missing sub-frames. FIG. 6 shows a graph of efficiency versus payload data length where both MAC overhead and BER are taken into account and employing the frame format of FIG. 5. The graph of FIG. 6 might be generated using an HIC field length of 2 bytes, an SFSN field length of 2 bytes, an SFCS field length of 2 bytes, and a sub-frame payload data length of 100 bytes. When comparing the graph of FIG. 6 with the graph of FIG. 4, employing a frame format in accordance with an exemplary embodiment of the present invention significantly increases the efficiency at bit error rates (BERs) higher than or equal to $10^5$.

An exemplary implementation as might be employed with wireless LANs operating in accordance with an 802.11 standard is now described. The 802.11 standard specifies the MAC layer protocol as carrier sense multiple access with collision avoidance (CSMA/CA) with random backoff. Optionally, request-to-send (RTS) and clear-to-send (CTS) messages exchanged between senders and receivers might also be employed. The exemplary implementation exhibits relatively small changes to MAC layer assembly/disassembly of frames, since selective acknowledgment/retransmission and re-ordering of sub-frames is accomplished at the application layer running on the host above the MAC layer.

Figure 7:
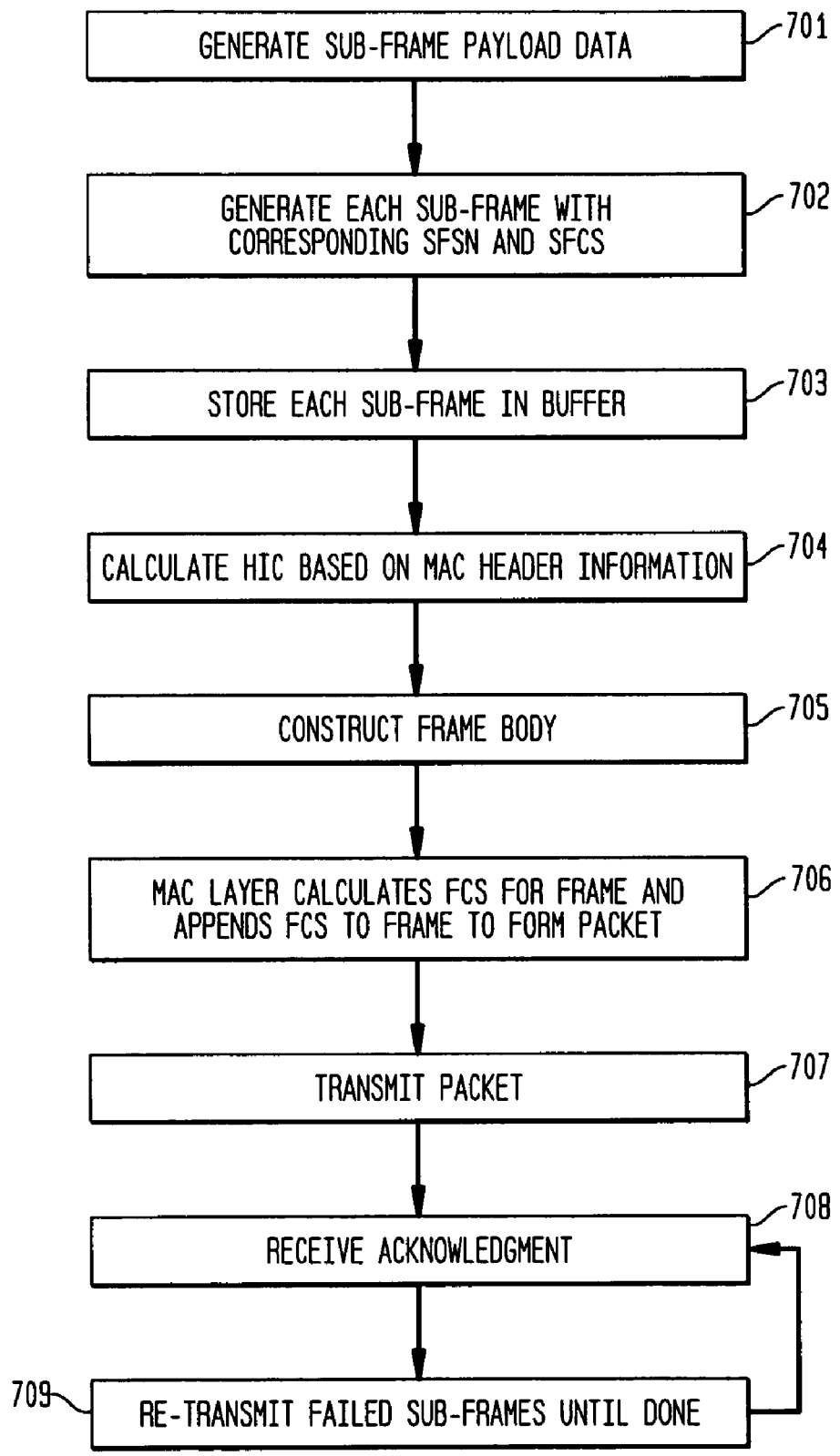
FIG. 7 shows an exemplary method employed by a sender using the exemplary format of FIG. 5.

FIG. 7 shows an exemplary method employed by a sender using the exemplary format of FIG. 5. At step 701, on availability of data to transmit, the application layer of the sender generates sub-frame payload data. If needed, the application layer divides and/or concatenates payload data to fit the sub-frame size. For preferred embodiments of the present invention, both the sender and the receiver agree on sub-frame size, which might be equal to a multimedia format's packet size.

At step 702, the application layer generates each sub-frame by calculating and pre-pending/appending each corresponding SFSN and SFCS to the sub-frame payload. At step 703, each sub-frame is stored in a buffer until its receipt is acknowledged or a (per sub-frame) retry limit is exceeded.

At step 704, the application layer calculates the HIC based on MAC header information known by the application. Some of the fields of the MAC header (such as Sequence Number) are based on the local state of the MAC layer and are not known by the application. Consequently, some embodiments of the present invention might generate or re-generate the HIC at the MAC layer prior to transmission. At step 705, the frame body is constructed from the sub-frames and passed to the MAC for transmission.

At step 706, the MAC layer calculates the FCS of the whole frame and pre-pends/appends the FCS to the frame. At step 707, the frame is sent using the "No Acknowledgment" policy as defined in, for example, the 802.11e draft 4.0.

The 802.11e draft 4.0 specifies a quality of service (QoS) data frame format that includes a QoS control field. The QoS control field includes a subfield that signals the acknowledgment (Ack) policy. One Ack policy is the "No Acknowledgment" (No Ack) policy. When a transmitter sends a QoS data frame using the No Ack policy, the addressed recipient will not respond with an ACK frame upon receipt of the frame. The transmitter assumes that the frame has been received successfully without regard of the actual result.

Returning to FIG. 7, at step 708, the sender receives an acknowledgment from the receiver of those sub-frames that were received correctly. The acknowledgment may comprise a list of sub-frame sequence numbers correctly received, or may comprise a start sub-frame sequence number followed by a bitmap in which each bit corresponds to a sub-frame relative to the start number (e.g., this acknowledgment format may be employed by the Block Ack mechanism described in a 802.11e draft 6.0).

At step 709, the sender retransmits, if necessary, those sub-frames that were not received by the receiver. In practice, steps 708 and 709 may occur repeatedly until all sub-frame data is acknowledged as being received by the receiver. Then the transmitter clears the sub-frame(s) from the buffers. Many re-transmission schemes are known in the art, and for some re-transmission schemes dedicated packets containing re-transmitted sub-frames might be employed. However, preferred embodiments of the present invention employ a frame format in which both new and re-transmitted sub-frames are included. Thus, the receipt of re-transmitted frames along with new frames might be similar to that described for steps 701-708.

To enable a receiver's application layer to receive data frames that have an invalid FCS comparison, but might have useful sub-frames, the MAC layer of the receiver allows for the following in its receive decision. The frame is not discarded when i) a quality of service (QoS) data frame using "No Ack" policy is received, ii) the Address 1 field matches the receiver's own address, and iii) the FCS is incorrect. Instead, the frame is passed from the MAC layer to the host with an indication that there is an FCS error.

Figure 8:
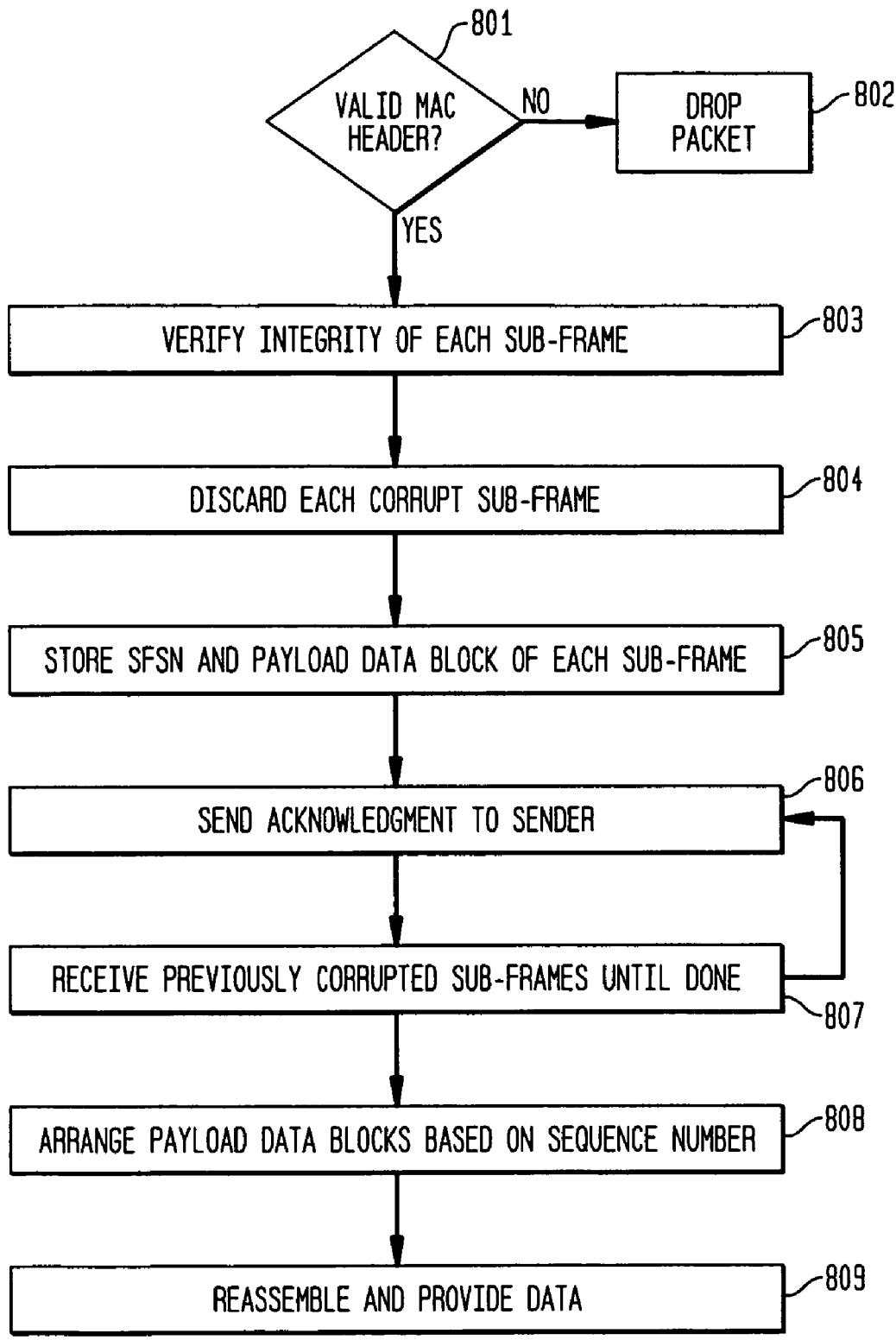
FIG. 8 shows an exemplary method employed by a receiver using the exemplary format of FIG. 5.

FIG. 8 shows an exemplary method employed by a receiver using the exemplary format of FIG. 5. At step 801, on reception of a frame, a test of the receiver's application layer verifies the integrity of the MAC header of the frame using the HIC field. If the test of step 801 fails, indicating a corrupted MAC header, at step 802, the receiver discards the whole frame.

If the test of step 801 passes, indicating a valid MAC header, at step 803 the receiver verifies the integrity of each sub-frame using the corresponding SFCS field. At step 804, each sub-frame that fails its integrity check is discarded. At step 805, the SFSN and payload data block of each correct sub-frame is stored in a re-ordering buffer. At step 806, the receiver sends an acknowledgment to the sender indicating those sub-frames that are correctly received. At step 807, the receiver receives those sub-frames from the sender in supplemental packets that were previously corrupted. Such supplemental packets might also conform to frame format 500 (FIG. 5), and such supplemental packets might be generated and received as described herein with respect to FIGS. 7 and 8.

For steps 806 and 807, acknowledgment and re-transmission might be repeated.(shown by the connecting arrow) and might be accomplished using various methods known in the art. For example, in response to every received frame, the receiver sends a normal directed data frame to the sender containing the sequence numbers of the sub-frames that were received correctly. Alternatively, methods providing selective acknowledgment/retransmission of whole frames, such as Block Acknowledgment as defined in the 802.11e draft version 4.0 or TCP Selective Acknowledgment, might be employed.

Returning to FIG. 8, at step 808, the sub-frame payload data blocks of the sub-frames in the re-ordering buffer are arranged in order based on sub-frame sequence number. At step 809, if needed, sub-frames are concatenated and/or divided back to generate reassembled data of the original packet data size and then the reassembled data is provided.

The described exemplary embodiments may be preferred when implementing the present invention in existing networks, since few changes are employed to the MAC layer mechanisms, with most changes between the MAC data service interface and higher layers (e.g., application layer). Other embodiments might be implemented with sub-framing and selective acknowledgment operations within the MAC layer entirely.

For the described embodiments herein, the checksum calculations employed to verify integrity might use a cyclic redundancy check (CRC) for the MAC header and sub-frames. Instead of CRC verification, Forward Error Correction (FEC) might also be employed for the RIC and the SFCSs. In addition, the number of erroneous sub-frames in a frame provides a measure of channel quality and might be employed for other applications, such as automatic rate selection and/or antenna diversity mechanisms.

While the exemplary embodiment of the present invention is described for WLANs operating in accordance with an edition of the IEEE 802.11 standard, the present invention is not so limited. One skilled in the art may extent the teachings herein to other types of local area networks having a unit within a network of fixed communication points.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of sending data by a transmitter, the method comprising the steps of:
   (a) forming a packet frame from payload data, the packet frame including two or more sub-frames and each sub-frame comprising sub-frame payload data and a sub-frame sequence number;
   (b) transmitting the packet frame to a receiver;
   (c) receiving an acknowledgment message from the receiver; and
   (d) determining, based upon the acknowledgment message, each sub-frame of the packet frame not properly received by the receiver
   (e) re-transmitting, to the receiver, each sub-frame not properly received by the receiver;
   (f) determining the number of erroneous sub-frames in the packet frame; and
   (g) adjusting antenna diversity based on the number of erroneous sub-frames in the packet frame.

2. The invention as recited in claim 1, wherein the acknowledgment message identifies each sub-frame of the packet frame properly received by the receiver.

3. The invention as recited in claim 1, further comprising the step of repeating steps (c), (d), and (e) until the receiver has properly received all of the payload data.

4. The invention as recited in claim 3, wherein repeating steps (c), (d), and (e) is in accordance with a block acknowledgment policy.

5. The invention as recited in claim 1, wherein step (a) forms the packet frame by the steps of:
   (a1) dividing the data payload into one or more sub-frame payloads;
   (a2) appending, to each of the sub-frame payloads, a corresponding sub-frame sequence number and a sub-frame integrity check value to generate a sub-frame;
   (a3) arranging the sub-frames into a sub-frame sequence;
   (a4) generating a header integrity check value for a header;
   (a5) appending the header integrity check value to the sub-frame sequence to form a frame; and
   (a6) appending the header and a packet frame integrity value to the frame to generate the packet frame.

6. The invention as recited in claim 1, further comprising the steps of detecting a channel condition based on the number of erroneous sub-frames and varying either a length of a sub-frame or a number of sub-frames in the sub-frame sequence based on the channel condition.

7. The invention as recited in claim 1, wherein the method is employed by the transmitter of a wireless network operating in accordance with an 802.11 standard.

8. The invention as recited in claim 7, wherein, for steps (a) through (e), the method transmits the packet frame in accordance with a carrier sense multiple access/collision avoidance (CSMA/CA) method in accordance with the 802.11 standard.

9. The invention as recited in claim 7, wherein, for step (a), the method generates the packet frame in accordance with a medium access control (MAC) layer protocol.

10. The invention as recited in claim 1, wherein step (g) further comprises the steps of:
    (h) determining a measure of channel quality using the number of erroneous sub-frames in the packet frame; and
    (i) adjusting the antenna diversity based on the measure of channel quality.

11. The invention as recited in claim 1, further comprising the step of:
    (g) adjusting a data transmission rate based on the number of erroneous sub-frames in the packet frame.

12. A method of processing a packet frame at a receiver, the method comprising the steps of:
    (a) receiving the packet frame, wherein 1) the packet frame comprises a header, a header integrity check value, a packet frame integrity check value, and two or more sub-frames, and 2) at least one sub-frame comprises a sub-frame integrity check value;
    (b) verifying the integrity of the received packet frame based on the packet frame integrity check value;
    (c) verifying, if the integrity of the received packet frame is verified, the integrity of the header based on the header integrity check value;
    (d) verifying, if the integrity of the header of the received packet frame is verified, the integrity of a sub-frame based on the corresponding sub-frame integrity check value;
    (e) determining a number of erroneous sub-frames in the packet frame; and
    (f) adjusting antenna diversity based on the number of erroneous sub-frames in the packet frame.

13. The invention as recited in claim 12, wherein, for step (a), each sub-frame comprises a sub-frame sequence number.

14. The invention as recited in claim 12, further comprising the step of generating payload data from the received packet frame.

15. The invention as recited in claim 12, wherein step (e) is in accordance with a block acknowledgment policy.

16. The invention as recited in claim 12, wherein, for step (d), the sub-frame integrity check value for a sub-frame is either a checksum value or a forward error correction value.

17. The invention as recited in claim 12, further comprising the step of dropping, if the integrity of the header of the received packet frame is not verified, the received packet frame.

18. The invention as recited in claim 12, wherein the method is employed by the transmitter of a wireless network operating in accordance with an 802.11 standard.

19. The invention as recited in claim 18, wherein, for steps (a) through (e), the method transmits the packet frame in accordance with a carrier sense multiple access collision avoidance (CSMA/CA) method in accordance with the 802.11 standard.

20. The invention as recited in claim 18, wherein, for step (a), the method receives the packet frame in accordance with a medium access control (MAC) layer protocol.

21. The invention as recited in claim 12, wherein step (f) further comprises the steps of:
  (g) determining a measure of channel quality using the number of erroneous sub-frames in the packet frame; and
  (h) adjusting the antenna diversity based on the measure of channel quality.

22. The invention as recited in claim 12, further comprising the step of:
  (g) adjusting a data transmission rate based on the number of erroneous sub-frames in the packet frame.

* * * * *